No. 842,295. PATENTED JAN. 29, 1907.
H. H. BLISH & G. C. SILZER.
DEVICE FOR SELLING GOODS.
APPLICATION FILED OCT. 9, 1906.
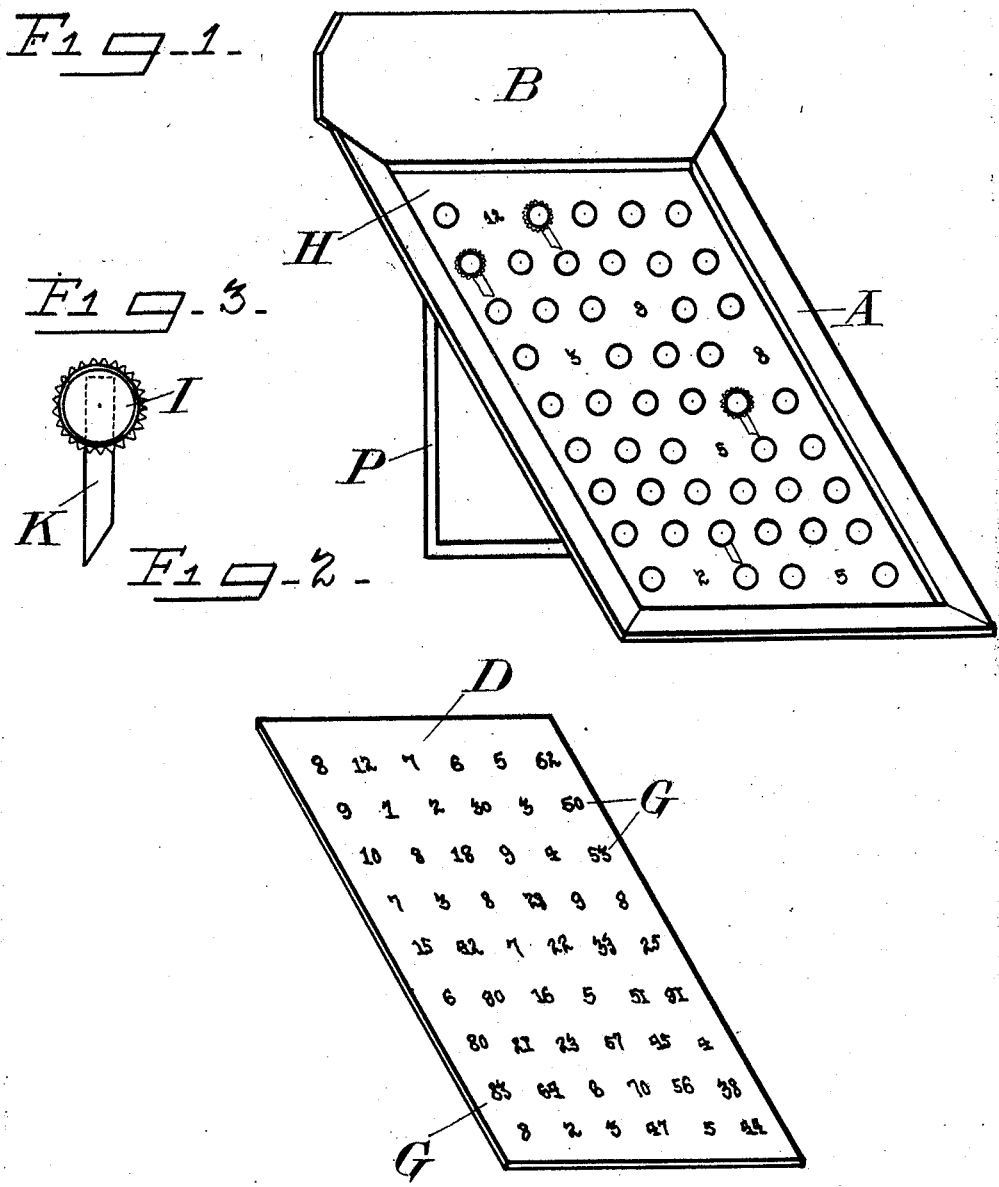
WITNESSES:
INVENTORS
Henry H. Blish
BY George C. Silzer
M. M. Cad ATTORNEY.

UNITED STATES PATENT OFFICE.

HENRY H. BLISH AND GEORGE C. SILZER, OF DUBUQUE, IOWA, ASSIGNORS TO HARGER & BLISH, OF DUBUQUE, IOWA, A CORPORATION OF IOWA.

DEVICE FOR SELLING GOODS.

No. 842,295.      Specification of Letters Patent.      Patented Jan. 29, 1907.

Application filed October 9, 1906. Serial No. 338,098.

*To all whom it may concern:*

Be it known that we, HENRY H. BLISH and GEORGE C. SILZER, citizens of the United States, residing at Dubuque, in the county of Dubuque and State of Iowa, have invented certain new and useful Improvements in Devices for Selling Goods, of which the following is a specification.

Our invention relates to means for selling or vending various kinds of merchandise; and one of the objects is to provide a device simple and inexpensive in construction and easily used, whereby an article may be introduced and kept upon the market without extensive and costly outside advertisement.

It consists, substantially, in a frame in which is a plate, having characters or indices thereon, and over these a transparent plate through which the indices are readily discernible, and covers over the indices, with means for removing the covers and exposing the indices on the plate through the transparent plate.

The following is a full and complete specification of the mode of construction and manner of operation when taken with the drawings accompanying the same and forming a part hereof.

Figure 1 is a perspective view of our device, showing part of the indices covered and part exposed. Fig. 2 is a plan view of the base-plate with indices thereon. Fig. 3 is a plan view of one of the coverings or seals with means for removing the same.

Referring to the drawings, A designates the frame, which is preferably of rectangular shape and provided with an extended top B, on which may be directions as to how the invention is to be used or some advertisement of the goods for sale. In this frame is placed an index-board D, preferably made of paper, on which is printed indices G. These indices may be letters, figures, or any other characters to suit the party using the device, and part of them may represent different values. Over the board with the indices thereon is placed a transparent plate H, which protects the indices and through which the indices are plainly discernible. Upon the plate is securely fastened seals I, entirely covering and concealing the indices G on the index-plate D. To each of these seals is secured a handle or releasing member K, whereby the seals I are lifted or torn off from the transparent plate H to expose the index beneath. The seals with the releasing members may be made of any material; but preferably the seals are of paper, fastened on the plate by paste, and the releasing members of ribbon, pasted beneath the seals, with their ends projecting out. The seals may have printed thereon character heads or sketches, and the ribbons of various colors, so as to present an attractive and novel appearance; but whatever design, color, or form is used it will still be in harmony with the spirit of invention. In the rear of the frame is a back plate (not shown) on which the index-plate rests, to which is secured a stay P, whereby the device may be sustained in an angular position.

One of the modes in which the various parts of our device may be assembled and used is substantially as follows: Over the index-plate with the indices printed thereon is placed the transparent plate H. Then the releasing members K are pasted upon the plate H over the indices, and over these are pasted the coverings or seals I, entirely concealing the indices G. These two plates H and D as thus prepared are placed in the frame A and the back plate with the sustaining-stay is secured to the frame against the back of the plate D. The articles for sale are, say, books having a uniform price, and each one of the indices G represents a book. Part of the indices represent in addition some other article of merchandise, like a jackknife, a sheet of music, or any other article that the tradesman has offered on the extended top B of the frame or in any other manner. The proposed purchaser pays the purchase price and takes the book and pulls up one of the ribbons K, and this tears off the covering I, exposing an index G. The purchaser then compares the exposed index with the various indices on the extended top of the board, and if his index is one that has some extra merchandise he receives that extra beside the book, but if not then he receives only the book purchased; but whatever index he may expose the purchaser is entitled to the book purchased.

It is manifest that the transparent plate H may be used alone and the indices G secured on one side of the plate and the coverings or seals I on the opposite side of the plate over the indices and all inclosed in a frame the same as the two plates.

Having now described our invention, what we claim is—

1. In a device for selling goods, an index-plate having indices thereon, a transparent plate over the index-plate, and coverings secured to the index-plate over indices on the index-plate.

2. In a device for selling goods, an index-plate, indices secured to the plate, a transparent plate over the index-plate, coverings secured to the transparent plate over the indices, and means for removing the coverings to expose the indices.

3. In a device for selling goods, an index-plate having indices thereon, a transparent plate, coverings secured to the transparent plate over the indices, and releasing means secured to the covering for removing and exposing the indices on the index-plate beneath the transparent plate.

4. In a device of the character described, an index-plate having indices thereon, a transparent plate over the index-plate, coverings secured to the transparent plate over the indices, means for removing the coverings to disclose the indices, and a supporting-frame inclosing the back and edges of the plates.

5. In a device for selling goods, a transparent plate, indices secured to one side of said plate, and coverings for said indices placed upon the opposite side of said transparent plate over the indices.

6. In a device for selling goods, a transparent plate, indices secured to one side of said plate, seals secured to said plate opposite the indices, and means for removing the seals and exposing the indices.

In testimony whereof we have signed our names to this specification in the presence of two subscribing witnesses.

HENRY H. BLISH.
GEORGE C. SILZER.

Witnesses:
M. M. CADY,
C. D. ROEHL.